No. 627,861. Patented June 27, 1899.
S. P. MACKEY.
WEIGHING MACHINE.
(Application filed Mar. 17, 1898.)
(No Model.) 2 Sheets—Sheet 1.

WITNESSES:
Donn Twitchell
Fred Acker

INVENTOR
S. P. Mackey
BY
Munn
ATTORNEYS.

THE NORRIS PETERS CO., PHOTO-LITHO., WASHINGTON, D. C.

No. 627,861. Patented June 27, 1899.
S. P. MACKEY.
WEIGHING MACHINE.
(Application filed Mar. 17, 1898.)
(No Model.) 2 Sheets—Sheet 2.
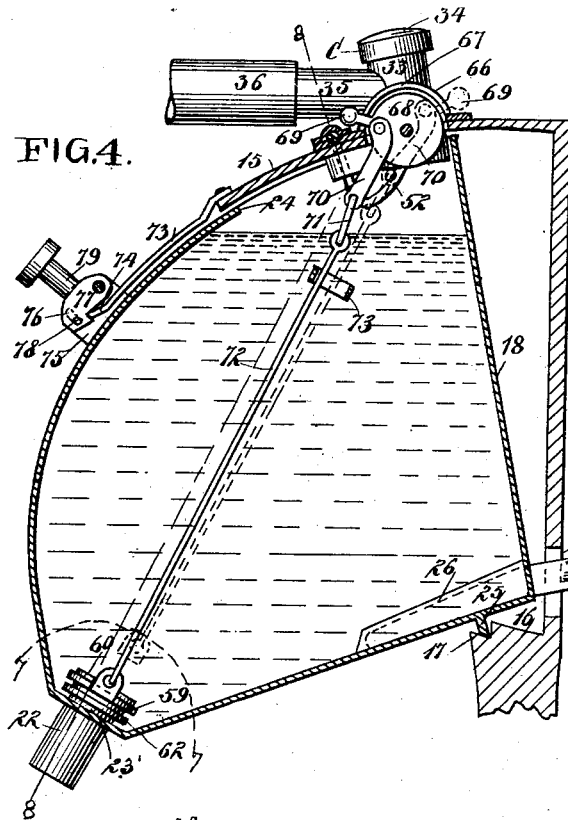
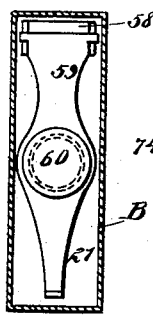
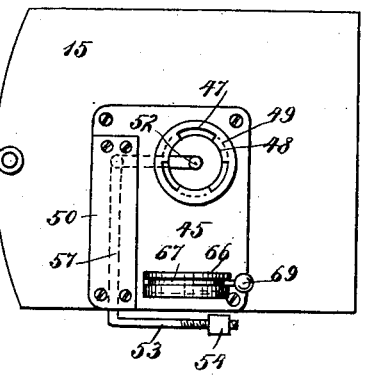
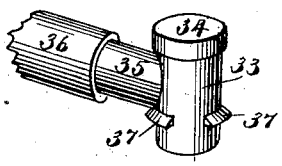
WITNESSES:
INVENTOR
S. P. Mackey
BY
ATTORNEYS.

UNITED STATES PATENT OFFICE.

SAMUEL PAXTON MACKEY, OF RIDGEFIELD, WASHINGTON.

WEIGHING-MACHINE.

SPECIFICATION forming part of Letters Patent No. 627,861, dated June 27, 1899.

Application filed March 17, 1898. Serial No. 674,184. (No model.)

*To all whom it may concern:*

Be it known that I, SAMUEL PAXTON MACKEY, of Ridgefield, in the county of Clarke and State of Washington, have invented a new and Improved Weighing or Measuring Machine, of which the following is a full, clear, and exact description.

The object of this invention is to provide a means for measuring out liquids by weight, it being particularly an improvement on the weighing or measuring machine for which a patent was granted to me October 20, 1896, No. 569,878.

The particular object of the improved machine is to provide a receptacle which having been connected with the source of supply will when placed in operative position open the valve and allow the liquid to enter until the weight of said liquid overbalances the weight of the scale-beam, turning a portion of the device, whereupon the receptacle will drop to a position which will allow the inlet-valve to close and whereby at the same time, if so desired, a second or outlet valve may be opened in the receptacle, allowing the liquid to find an exit therefrom. The special improvements in the device over those shown in the patent above referred to consist in providing a means whereby a weighing or measuring receptacle may be so placed upon a support that one of such devices or machines can accommodate several different storage-reservoirs, and whereby the attachment between the machine and any one of the reservoirs may be quickly and conveniently made, and whereby, further, the scale-beam will be more effective in its operation and will indicate liquid measures and the fractions thereof.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 2:
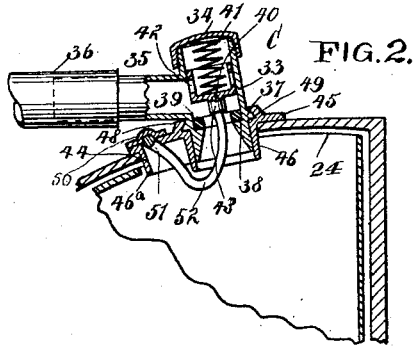
Figure 1:
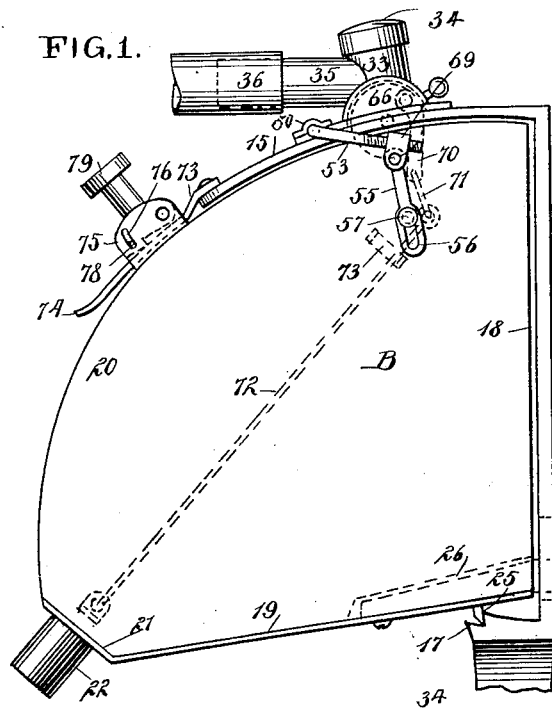
Figure 3:
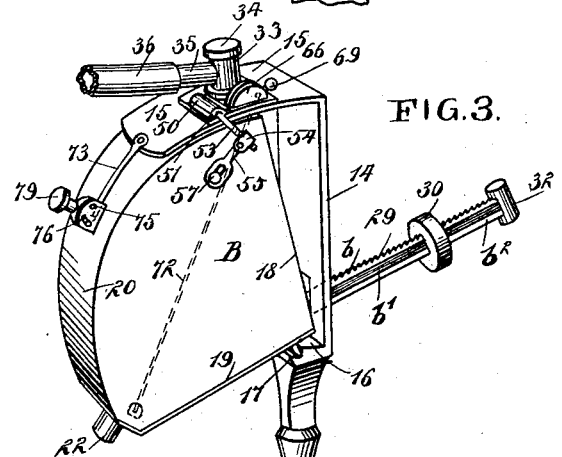

Figure 1 is a side elevation of the improved machine, illustrating it in position to receive material from a reservoir. Fig. 2 is a vertical section through the upper portion of the machine and the inlet-valve of the same, the receptacle being in its receiving position. Fig. 3 is a perspective view of the machine or device, illustrating it in the position it occupies after it has received a predetermined quantity of material from a reservior. Fig. 4 is a vertical section through the body portion of the machine, illustrating it in the position it occupies when it has received its proper amount of material and the material is to be discharged. Fig. 5 is a side elevation of a portion of the scale-beam. Fig. 6 is a plan view of the upper extension of the support for the receptacle of the machine, the inlet-valve being removed. Fig. 7 is a horizontal section through a portion of the receptacle of the machine, illustrating in plan view the outlet-valve, the section being taken on the line 7 7 of Fig. 4. Fig. 8 is a section taken longitudinally through the receptacle of the machine on the line 8 8 of Fig. 4, the said section being contracted and taken through the outlet-valve, showing a portion of the inlet-valve in elevation; and Fig. 9 is a detail perspective view of the inlet-valve removed from engagement with the machine.

Ordinarily a standard A is provided, which is supported by feet 10, the said feet being provided with adjusting-screws 11, having heads 12 at their lower ends, adapted to engage with the floor or other support, and the said heads are provided with apertures 13. Through the medium of adjusting-screws the standard and, in fact, the entire machine may be plumbed, and after the plumbing of the machine it can be secured to a predetermined support by passing screws or equivalent fastening devices through the apertures 13 in the heads of the adjusting-screw.

The upper vertical portion 14 of the standard A is preferably flat and in the nature of a plate extending from what may be termed the "rear" to the greater body portion of the standard, and at the top of the reduced or flattened portion 14 of the standard A a downwardly and forwardly curved plate 15 is secured or made integral with the aforesaid portion 14 of the standard. Where the reduced portion 14 of the standard connects with the larger or body portion, a shoulder 16 is formed, and in the forward portion of this shoulder a recess 17 is made, which is in the nature of a V-groove, as shown particularly in Figs. 1 and 4.

A receptacle B, adapted to receive material to be weighed, is supported by the standard A. This receptacle is preferably made with a straight back 18, a substantially straight bottom 19, a curved front 20, and a beveled lower front portion 21, at which latter point an outlet-tube 22 is secured, which tube extends within the receptacle B, as illustrated at 23 in Fig. 8. At the upper portion of the receptacle B a mouth-opening 24 is made, extending from the back 18 a predetermined distance through the front 20, and this mouth-opening 24 is normally covered by the upper curved section or lip 15 of the standard A, no matter whether the receptacle B is in the receiving or in the discharging position.

At the bottom of the receptacle B, a suitable are produced. For instance, for liquids of seven pounds weight to the gallon fourteen ounces would insure a proper measurement of a pint. For liquids weighing eight pounds to the gallon sixteen ounces should be registered by the weight on the scale-beam to insure a pint of liquid being contained in the reservoir, and if a quart be desired the weight on the scale-beam would be carried to the quart-mark, which would in ordinary scale-beams indicate thirty-two ounces, and so on up to a gallon. The main weight 30 is preferably of such size that it will weigh up to half the capacity of the receptacle B, and for amounts above such quantity the second weight is usually brought into requisition.

The inlet-valve C for the receptacle is adaptthe upper face of the plate 45, and this flange is provided with horizontal lugs 48 equidistant apart, each lug being provided with an undercut groove 49 in its inner face, as shown in Figs. 2 and 6. When the inlet-valve C is to be attached to the device, the lugs 37 of the valve casing or tube are entered in the space between the lugs 48 on the plate 45, and the valve casing or tube is then turned so as to bring its lugs 37 into the undercut grooves of the lugs 48 on the said plate 45, as shown in Fig. 2, the valve being omitted in Fig. 6.

Longitudinally of the plate 45 and transversely of the upper member 15 of the standard A a box 50 is located, in which a shaft 51 is mounted to turn. This shaft is provided at one end with a crank-arm 52, which extends downward below the collar 46 and upward into the valve-casing 33 to an engagement with the lug 43 on the valve in said casing. At the opposite end of the shaft 51 a second crank-arm 53 is formed. This crank-arm extends along the outer face of the receptacle B and is threaded at its free end, carrying at its threaded portion a nut 54. This nut is pivotally attached to a link 55, the said link being provided with a slot 56 at its lower end, receiving a stud 57, secured to the outer face of the receptacle B. When the receptacle is in position to receive material, as illustrated in Fig. 1, the crank-arm 53 will be carried upward and the opposing crank-arm 52 will be carried in a like direction, forcing the valve 40 upward in its casing to permit the liquid or other material to flow from the reservoir, with which the valve is connected, through the mouth of the receptacle B and into said receptacle. When, however, the receptacle B has received sufficient material to overbalance the weight on the scale-beam, the receptacle will drop to the position shown in Fig. 3, the outer crank-arm 53 being carried downward, and likewise the inner crank-arm 52, permitting the valve 40 to seat itself on the washer 39, cutting off further supply of material to said receptacle. The stud 57 is so placed that it lies in a line between the fulcrum of the receptacle and the hinged connection between the link 55 and nut 54, or the nut 54 can be adjusted to lie exactly in such line. By this means the pressure of the valve will not affect the balance of the receptacle.

In the inclined bottom portion 21 of the receptacle B, or that portion at which the outlet-spout 22 is applied, an interior bearing 58 is provided, in which bearing one end of a plate 59 is journaled, which plate may be termed a "valve-carrying" plate or arm, since it is provided with an opening at the center receiving a valve 60, the said valve being provided with a marginal flange 61 at the top, extending upon the upper face of the plate or arm beyond the opening receiving the valve, and a washer 62 is placed upon the bottom of the valve 60 below the plate or arm 59, the said washer being held in place by a nut 63, which is screwed upon a stud 64, extending from the under face of the valve, as shown in Fig. 8, and this stud 64 is adapted to receive the upper end of a spring 65, the lower end of the spring being secured within the outlet-tube 22, the spring serving to hold the valve seated—that is, with its washer 62 in firm engagement with the inwardly-extending portion 23 of the outlet-tube 22.

The opening in which the inlet-valve C is entered is near the inner edge of the plate 45, and near the outer edge of the said plate 45 a second opening is made transversely of the plate and closed by a semicircular casing 66, in which casing a slot 67 is made. Within the casing and the slot which it covers a disk 68 is mounted to revolve, being pivoted at its center in any suitable or approved manner. The disk, which is shown best in Fig. 4, is provided with a handle 69, extending out through the slot 66. A pitman 70, curved at its upper end, is pivoted at said curved upper end eccentrically on the disk 68. A hook 71 is connected with the lower end of the pitman 70, and a rod 72 is also connected with the hook 71, which rod 72 extends downward through the guide-loop 73, formed upon the inner side face of the receptacle B, and the rod 72 is pivotally attached to the free end of the valve-carrying arm or plate 59, as shown in Figs. 4 and 8. When it is desired that the contents of the receptacle B shall be automatically discharged after the receptacle has received its quota of material, the handle 69 is carried in direction of the back of the receptacle or in direction of the upright portion of the standard A, as shown in positive lines in Fig. 1 and in dotted lines in Fig. 4. When the handle 69 is in such position, the pivoted end of the pitman 70 will be back of and beyond the pivot of the disk 68 and the rod 72 will have been drawn upward to such an extent that, while the outlet-valve 60 will be seated on the outlet-tube 22 while the receptacle is in receiving position, the moment that the receptacle is dumped or swings forward to the position shown in Figs. 3 and 4 the outlet-valve will leave the outlet-tube 22, permitting the liquid to escape. When, however, the handle 69 is carried to the forward position, (shown in Fig. 4 in positive lines,) the outlet-valve will remain closed during the time that the receptacle is receiving material and after the receptacle has received its quota of material. When the outlet-valve is thus plugged, the material cannot be discharged from the receptacle until the handle 69 is carried to the rear position, (shown in dotted lines in Fig. 4,) which will cause the rod 72 to remove the valve from over the outlet-tube 22.

In order that no material that may follow the crank-arm 52 upward shall escape at the top portion of the device, a collar 46$^a$ is constructed around the said crank-arm 52 where it connects with the shaft 51, as illustrated in Fig. 2.

The receptacle is prevented from returning to its receiving position when its contents have been partially discharged preferably through the medium of a tongue 73 of a spring material secured to the central portion of the forward end of the upper member 15 of the standard A. The tongue 73 is provided with an upwardly-extending free end 74, as shown in Fig. 4. The tongue is adapted to pass between ears 75, which are formed upon the forward edge of the receptacle B, and beneath a latch 77, which latch is pivoted between said ears, and the latch is provided with pins 78, which extend through slots 76, made in the said ears. The latch is provided with a head extending beyond the under edge of the body, and the latch is further provided with a handle 79. When the receptacle is in its receiving position, the latch will be over the central portion of the tongue, the head of the latch bearing on the tongue, as shown in Fig. 1, and when the receptacle tips forward, having received the necessary amount of material, the free upwardly-turned end 74 of the tongue will engage with the shoulder portion of the head of the latch, as shown in Fig. 4, effectually preventing the receptacle returning to its receiving position unless the latch is drawn upward through the medium of the handle 79 clearing the tongue 73.

Having thus described my invention, I claim as new and desire to secure by Letters Patent—

1. A support, a weighing and measuring receptacle mounted to rock upon said support, an inlet-valve having removable attachment to the said support and also having connection with the interior of the receptacle, the opening and closing movements of the inlet-valve being controlled by the movements of the receptacle, and an outlet-valve for the receptacle, capable of adjustment for manual or for automatic operation by the movement of the receptacle, as and for the purpose specified.

2. In a weighing and measuring machine, the combination, with a standard, a receptacle having a knife-fulcrum thereon, the said receptacle being provided with a mouth normally open, an extension from the standard normally covering the mouth of the said receptacle, and a scale-beam attached to the receptacle, extending rearward of its fulcrum, of a valve removably carried by the upper extension of the standard, being in communication with the interior of the receptacle, a locking device for the valve-casing, a lifting device for the valve operated by the movement of the said receptacle, and a lock for the receptacle, preventing the return of the receptacle to its initial position after said receptacle has received a predetermined quantity of material, for the purpose set forth.

3. In a weighing and measuring machine, the combination, with a standard, a receptacle having a knife-fulcrum thereon, the said receptacle being provided with a mouth normally open, an extension from the standard normally covering the mouth of the said receptacle, and a scale-beam attached to the receptacle, extending rearward of its fulcrum, of an inlet-valve, the casing of which is provided with a locking device for engagement with the upper extension of the standard, the valve-casing being in communication with the interior of the said receptacle, a crank-shaft, one crank-arm of which is adapted to operate the inlet-valve the other arm being operated by the movement of said receptacle, an outlet-valve for the said receptacle, having a hinged connection therewith, a lift-rod connected with the said outlet-valve, a disk mounted in the upper extension of the standard, a handle for the disk, a pitman connected with the disk, and a hook connection between the pitman and the lift-rod, for the purpose specified.

4. In a weighing and measuring machine, the combination, with a support, a receptacle fulcrumed upon the said support, provided with an attached scale-beam, and an extension from the upper portion of the support, normally closing the mouth of the said receptacle, of an inlet-valve, means for locking the inlet-valve to the upper extension of the said support, the inlet-valve being removable from the support and having communication with the interior of the receptacle, the valve being spring-controlled within its casing, a crank-shaft journaled upon the extension of the support, provided with a crank-arm arranged for engagement with the valve, and a second crank-arm connected with the casing, all operated in the manner substantially as herein shown and described.

5. In a weighing and measuring machine, the combination, with a support, a receptacle fulcrumed upon the said support, provided with an attached scale-beam, and an extension from the upper portion of the said support, normally closing the mouth of the said receptacle, of an inlet-valve, means for locking the inlet-valve to the upper extension of the said support, the inlet-valve being removable from the support and having communication with the interior of the receptacle, the valve being spring-controlled within its casing, a crank-shaft journaled upon the extension of the support, provided with a crank-arm arranged for engagement with the valve, a second crank-arm connected with the casing, a plate hinged in the bottom portion of the receptacle, a valve carried by the said plate, adapted to normally close an outlet-opening in the receptacle, a disk mounted in the upper extension of the said support, capable of operation by hand, a lift-rod connected with the hinged valve-carrying plate, a pitman eccentrically attached to the said disk, and a hook connection between the said pitman and lift-rod, for the purpose described.

6. The combination of a support, a receptacle mounted on the support, means for balancing the receptacle, a valve commanding the outlet from the receptacle, a disk mounted to turn on the support, a connection between the disk and the valve by means of which the valve is automatically operated upon the tilting of the receptacle, and a handle attached to the disk by which to manually actuate the valve.

7. The combination of a support, a valved receptacle mounted to swing thereon, a valve mounted on the support and controlling the inlet to the receptacle, a rock-shaft mounted on the support, a crank-arm attached to the rock-shaft and in connection with the valve to actuate the same, and a second crank-arm also attached to the rock-shaft and having sliding connection with the receptacle.

8. The combination of a support, a tilting receptacle mounted thereon, means for balancing the receptacle, a valve-casing attached to the support and leading into the receptacle, a valve commanding the valve-casing, a rock-shaft mounted in the valve-casing, a crank-shaft attached to the rock-shaft and extended into the casing and having connection with the valve to operate the same, and a second crank attached to the rock-shaft and having connection with the receptacle.

9. The combination of a support, a receptacle mounted to tilt thereon, a valve commanding the receptacle, a disk mounted to turn on the support, and a connection between the disk and said valve.

SAMUEL PAXTON MACKEY.

Witnesses:
A. H. WITHINGTON,
Z. W. A. SNOW.